United States Patent
Watanabe et al.

(10) Patent No.: US 12,026,157 B2
(45) Date of Patent: Jul. 2, 2024

(54) NARROWING SYNONYM DICTIONARY RESULTS USING DOCUMENT ATTRIBUTES

(71) Applicant: International Business Machines Corporation, Armonk, NY (US)

(72) Inventors: Kenta Watanabe, Soka (JP); Takahito Tashiro, Mitaka (JP); Takashi Fukuda, Nerima (JP)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 17/331,719

(22) Filed: May 27, 2021

(65) Prior Publication Data

US 2022/0382753 A1 Dec. 1, 2022

(51) Int. Cl.
G06F 16/2453 (2019.01)
G06F 16/93 (2019.01)

(52) U.S. Cl.
CPC .......... *G06F 16/2453* (2019.01); *G06F 16/93* (2019.01)

(58) Field of Classification Search
None
See application file for complete search history.

(56) References Cited

U.S. PATENT DOCUMENTS

| | | | |
|---|---|---|---|
| 2006/0253476 A1* | 11/2006 | Roth | G06F 40/12 |
| 2011/0184946 A1* | 7/2011 | Hennum | G06F 16/3338 |
| | | | 707/769 |
| 2014/0288946 A1* | 9/2014 | Shinohara | G06F 40/53 |
| | | | 705/2 |
| 2017/0132203 A1* | 5/2017 | Kim | G06F 40/279 |
| 2020/0097552 A1 | 3/2020 | Takaaki | |
| 2020/0301953 A1* | 9/2020 | Abhyankar | G06F 16/3328 |
| 2021/0089722 A1* | 3/2021 | Iwayama | G06F 40/247 |

FOREIGN PATENT DOCUMENTS

| | | |
|---|---|---|
| CN | 103106189 B | 4/2016 |
| JP | 2016075986 A | 5/2016 |
| WO | 2014002775 A1 | 1/2014 |

OTHER PUBLICATIONS

Vicente Bosch; Text Line Extraction Based on Distance Map Features and Dynamic Programming; IEEE; pp. 357-362 (Year: 2018).*
"Information Technology", Rondhuit, Mar. 24, 2021, 6 pages.
Han, Chao, "Automatically Buid Solr Synonyn List using Machine Learning", Lucidworks, Oct. 30, 2018, 29 pages.

* cited by examiner

*Primary Examiner* — Albert M Phillips, III
*Assistant Examiner* — Jermaine A Mincey
(74) *Attorney, Agent, or Firm* — Gavin Giraud (57) ABSTRACT

In a method for improving generation and relevancy of search results, a processor receives a search query comprising a search term. A processor generates a document group based on the search query and at least one synonym related to the search term in a synonym dictionary. The synonym dictionary may include search document attributes for base words and synonyms of the base words. A processor extracts, from the document group, an extracted document having a document attribute matching a search document attribute of the at least one synonym. A processor lists the extracted document as a search result.

20 Claims, 7 Drawing Sheets

| WORD | BEGIN DATE | END DATE | LOCATION | AUTHOR |
|---|---|---|---|---|
| "BUCK" | 01/01/1800 | PRESENT | US | TOM |
| TALLY | 10 | 45 | 120 | 2 |

408 — "BUCK" row; 406 — TALLY row; 404 — spans BEGIN DATE through AUTHOR

| | WORD | BEGIN DATE | END DATE | LOCATION | AUTHOR | RANK |
|---|---|---|---|---|---|---|
| BASE WORD | DOLLAR | - | - | - | - | |
| SYNONYMS | MONEY | - | - | US | TOM | 1 |
| | BILL | 2000/01/01 | - | UK | JOHN | 2 |
| | BUCK | 1800/01/01 | 2100/12/12 | US (SOUTH) | - | 3 |
| | KANE | 1900/01/01 | - | JP | - | 4 |

532 — BASE WORD; 534 — SYNONYMS; 536 — spans WORD through RANK

| | BILL | MONEY | BUCKS |
|---|---|---|---|
| BILL | 0 | 0.2 | 0.9 |
| MONEY | 0.2 | 0 | 0.4 |
| BUCKS | 0.9 | 0.4 | 0 |

NARROWING SYNONYM DICTIONARY RESULTS USING DOCUMENT ATTRIBUTES

BACKGROUND

The present invention relates generally to the field of document indexing and searching, and more particularly to narrowing synonym dictionary results using document attributes attached to each synonym.

In Information Technology (IT), text is a human-readable sequence of characters. Words formed from the text can be encoded into computer readable formats. Text is distinguished from non-character encoded data, e.g. objects, such as graphic images and the words. A document is formed from textual information, which may be in an electronic form and stored in a computer as one or more files. The document may include one or more sentences of contiguous text.

A synonym dictionary contains words that are synonyms of each other. Synonym dictionaries typically list a base word with several synonyms associated with the base word. The synonyms of the base word may be organized by definition of the base word (e.g., words with noun and verb definitions would have groups of synonyms for each meaning). A synonym dictionary can improve query results by searching for synonyms of your query terms in a text search index. A synonym dictionary can be limited to words specific to a particular organization, returning acronyms and technical jargon from a search query. By default, some search indexes do not include a synonym dictionary: each synonym dictionary must be explicitly added to a specific text search index. The text search index needs to be updated at least once before adding a synonym dictionary. After the synonym dictionary has been added, it can be modified before each search, if desired.

SUMMARY

According to one embodiment of the present invention, a computer-implemented method, a computer program product, and a computer system are provided. A processor receives a search query comprising a search term. A processor generates a document group based on the search query and at least one synonym related to the search term in a synonym dictionary. The synonym dictionary may include search document attributes for base words and synonyms listed in the synonym dictionary. A processor extracts, from the document group, an extracted document having a document attribute matching a search document attribute of the synonym. A processor lists the extracted document as a search result.

DETAILED DESCRIPTION

Creation of a synonym dictionary in a document search or in the text mining system is an important operation to improve search and analysis accuracy. A general process to create a synonym dictionary may include defining several synonyms for a base word. The meaning of a word (i.e., either synonym or base word), however, may vary depending on how the word is used, and on the attributes under which the document was created. Therefore, embodiments of the present invention disclose a document search program that improves performance of a search engine by limiting results generated from a search query. Specifically, the document search program may be prompted or prevented from hitting documents containing a certain synonym by taking into account document attributes of each document in an initial search query.

Figure 1:
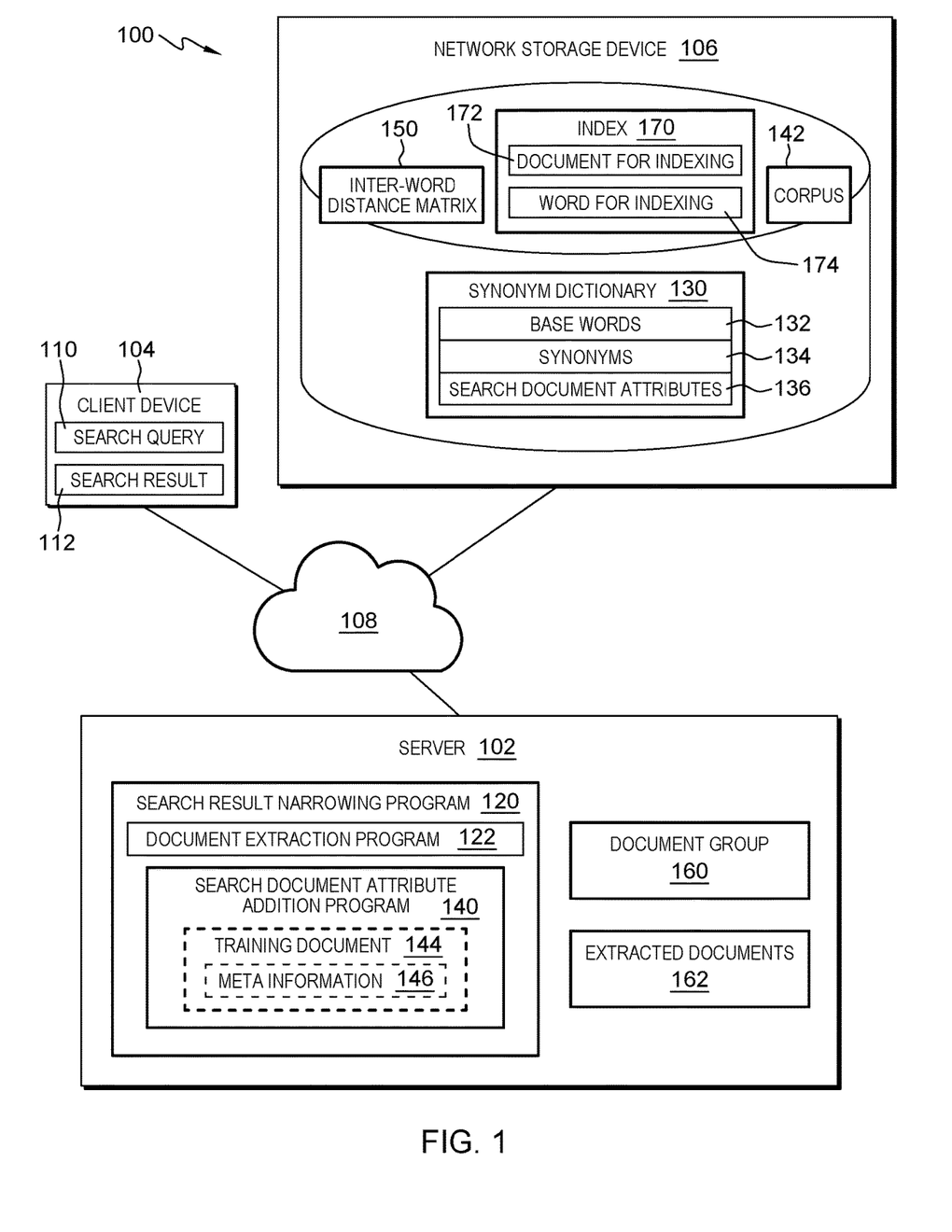
FIG. 1 is a functional block diagram illustrating a searching environment, in accordance with an embodiment of the present invention.

Referring now to the figures, FIG. 1 is a functional block diagram illustrating a searching environment 100 with tools to support document searching, indexing, and narrowing of search results. As shown, a server 102 is provided in communication with client devices 104 and a network storage device 106 across a network connection 108. The server 102 runs programs to provide a narrowed search result 112 for search queries 110 received over the network connection 108 from the client devices 104. The client devices 104 and the server 102 communicate with each other and with other devices or components via one or more wires and/or wireless data communication links, where each communication link may include one or more of wires, routers, switches, transmitters, receivers, or the like. In this networked arrangement, the server 102 and the network connection 108 may enable document processing and indexing for one or more content users. Other embodiments of the server 102 may be used with components, systems, subsystems, and/or devices other than those that are depicted herein.

The tools, including a search result narrowing program 120, may be configured to receive input from various sources, including but not limited to input from the network storage device 106 through the network 108. The various client devices 104 in communication with the network 108 demonstrate access points for clients searching through documents available on the network storage device 106. The network 108 may include local network connections and remote connections in various embodiments, such that the programs on the server 102 may operate in environments of any size, including local and global (e.g. the Internet).

The server 102 may be embodied on a device that ranges from small handheld devices, such as a handheld computer/mobile telephone, to large mainframe systems, such as a mainframe computer. Examples of a handheld computer include personal digital assistants (PDAs), personal entertainment devices, smartphones, and tablets. Types of computer network 108 that can be used to interconnect the various information handling systems include Local Area Networks (LANs), Wireless Local Area Networks (WLANs), the Internet, the Public Switched Telephone Network (PSTN), other wireless networks, and any other network topology that can be used to interconnect the information handling systems. Many of the information handling systems include nonvolatile data stores, such as hard drives and/or nonvolatile memory. Some of the information handling systems may use separate nonvolatile data stores.

The network storage device 106 may house information that is available to multiple client devices 104 and servers 102. The server 102 may edit the stored components in a manner explained in detail below. For example, the server 102 adds search document attributes 136 (e.g., year of creation, author's attributes (hometown, age at the time of writing, living environment, circumstances) to entries in a synonym dictionary 130. The server 102 may also include memory for storing programs and temporary files or folders.

Figure 2:
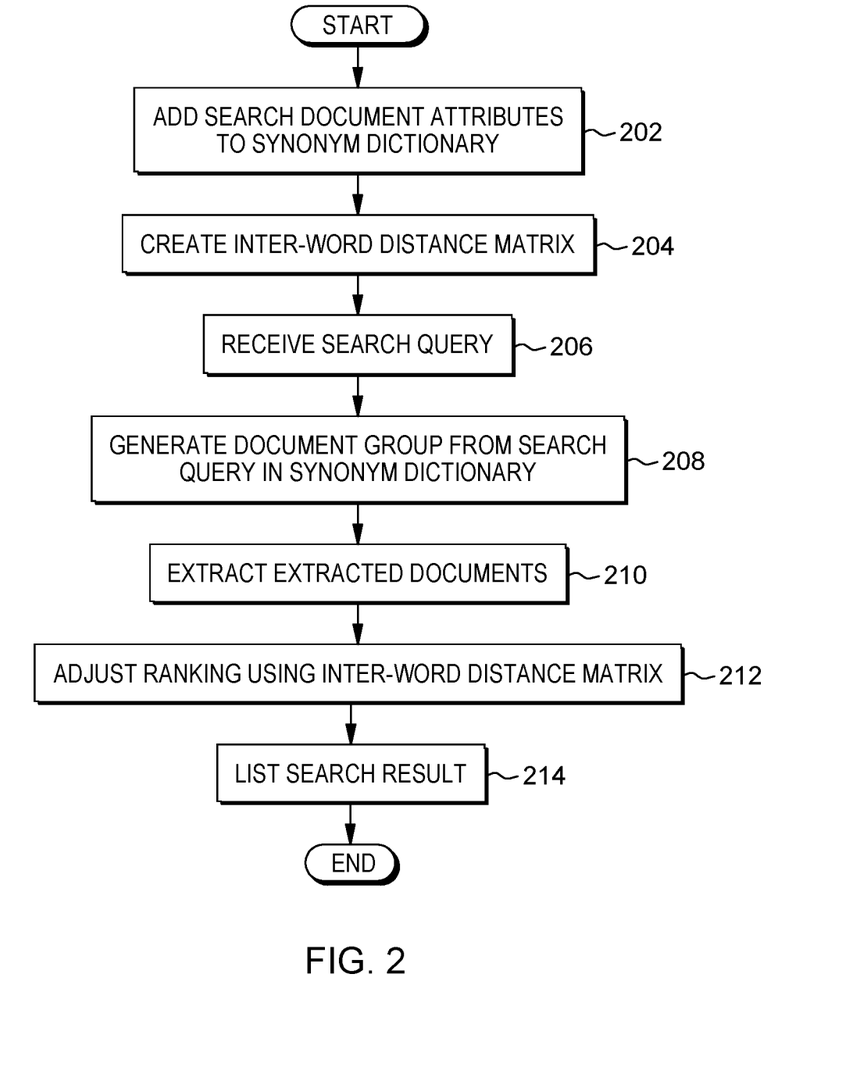
FIG. 2 is a flowchart depicting operational steps of a search result narrowing program, in accordance with an embodiment of the present invention.

FIG. 2 is a flowchart depicting operational steps of the search result narrowing program 120, in accordance with an embodiment of the present invention. The search result narrowing program 120 operates in the searching environment 100 with the synonym dictionary 130, and may access the synonym dictionary 130 through the network 106. The search result narrowing program 120 adds search document attributes 136 to the synonym dictionary 130 (block 202). That is, to increase accuracy of the relationship between base words 132 and synonyms 134, the synonyms 134 are given a search document attribute 136 for conditions under which the meaning of the synonym 134 is close to the base word 132. The search document attribute 136 may be added by incorporating a manually-created list. A user, or many users, may look at each synonym and determine circumstances under which the synonym 134 was similar to the base word 132. The search document attributes 136 may also be added algorithmically. An example of a process by which the search narrowing program 120 may add search document attributes 136 is depicted in FIG. 3.

Figure 3:
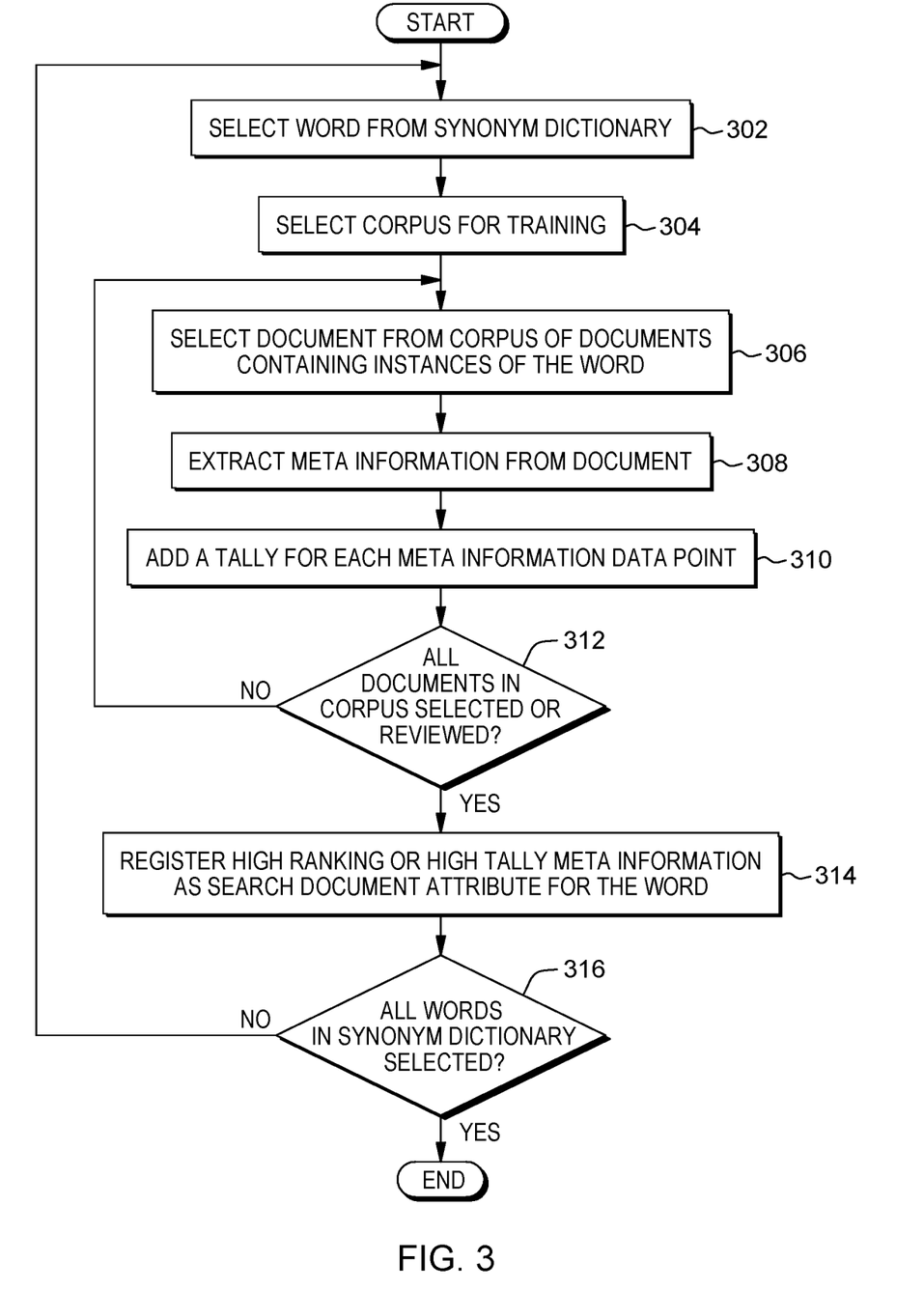
FIG. 3 is a flowchart depicting operational steps of a search document attribute addition function, in accordance with an embodiment of the present invention.

FIG. 3 is a flowchart depicting operational steps of a search document attribute addition function 140, in accordance with an embodiment of the present invention. The search document attribute addition function 140 may operate as a component of the search narrowing program 120, or may operate as an independent program that adds the search document attributes 136 to the synonym dictionary 130 before the synonym dictionary 130 is used by the search narrowing program 120. The search document attribute addition function 140 selects a word from the synonym dictionary 130 (block 302). The word may include any of the base words 132 or synonyms 134 contained in the synonym dictionary 130. The word may be selected alphabetically, randomly, by user designation, or using another selection criteria. In one example, the search document attribute addition function 140 may select "buck" (listed in the synonym dictionary 130 as a synonym for the base word "dollar") as the word.

The search document attribute addition function 140 then selects a corpus 142 for training the synonym dictionary 130 (block 304). The corpus 142 is a collection of documents (e.g., articles, messages, posts) that use the word in a context that is similar to the base word (or the word is a base word). In the example of the search document attribute addition function 140 selecting buck, the corpus 142 would include documents in which buck means "dollar" rather than any other meaning of buck. The corpus 142 may be limited to hand-picked user-designated documents for training. Additionally or alternatively, the corpus 142 may include documents from a general or context-specific information source. For example, the general information source may include an encyclopedia or a comprehensive website (e.g., Wikipedia®). The context-specific information source may include a medically focused journal, an engineering publication, a social media feed, or other focused content generation platform. The selection of the corpus 142 will provide focused search document attributes 136 reflecting the source material therein. The same corpus 142 may be used for all words selected from the synonym dictionary 130, but subsequent repetitions by the search document attribute addition function 140 may also select a different corpus 142 for each word selected from the synonym dictionary 130.

From the corpus 142, the search document attribute addition function 140 may then select a training document 144 (block 306). The training document 144 may be selected from any of the documents in the corpus 142, and the selection may be based on the number of times that the word appears within the training document 144. The search document attribute addition function 140 may, in certain embodiments, restrict selection of the training document 144 to one of the documents in the corpus 142 that contains the word at least a threshold number of times. If the document contains the word less than the threshold number (e.g., does not contain the word), or some of the instances of the word do not match meaning of the base word, then the document would not be selected as a training document 144.

The search document attribute addition function 140 then extracts meta information 146 from the selected training document 144 (block 308). The meta information 146 may include any information within or about the training document 144 that could show where or when the word is used or who the word is used by. For example, the meta information 146 may include: an author, an author's hometown, an author's age at the time of writing, an author's living environment, a document subject, or a story setting (e.g., wild west, Tokugawa shogunate, space sci fi, Idaho), a year of creation, or a location of publication.

Figure 4:
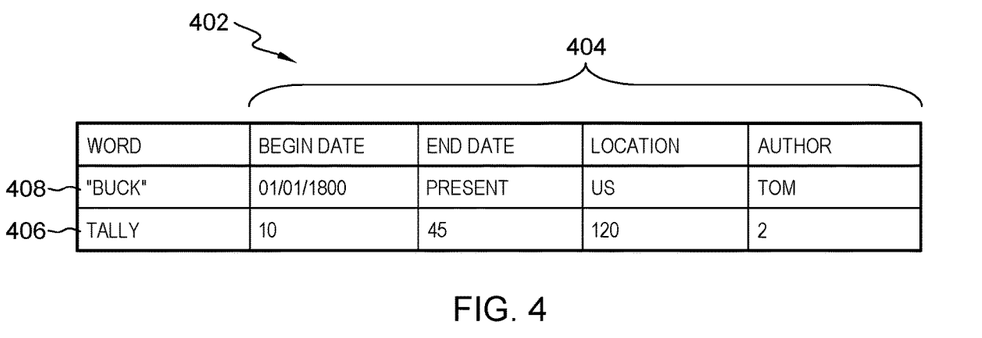
FIG. 4 is table depicting a meta information table, in accordance with an embodiment of the present invention.

The search document attribute addition function 140 then adds a tally for each meta information data point that is collected about the training document 144 (block 310), and determines whether all documents in the corpus 142 have been selected or reviewed (block 312). If the corpus 142 has not completely reviewed (block 312, "No") then the search document attribute addition function 140 repeats extracting meta information and tallying for a new training document 144 (block 306, again). The search document attribute addition function 140 may tally the meta information in a meta information table 402 for each word selected from the synonym dictionary 130, as shown in FIG. 4, which is a meta information table 402 for "buck" a synonym of "dollar." The meta information table 402 tracks meta information data points 404 and tallies 406 for the number of documents for which that meta information data point 404 was associated with the selected word 408. FIG. 4 shows results of the search document attribute addition function 140 having reviewed the corpus 142, and determining that: 10 documents have used buck as early as 1800, therefore the tally for the Begin Date for the use of the synonym is Jan. 1, 1800; forty-five documents in the corpus 142 have a present day use for buck, therefore the tally for the End Date is determined to be "present"; one-hundred and twenty documents contained buck and a location identifier indicating the US; and two documents have an author named "Tom."

When the entire corpus 142 has been reviewed (i.e., every document is selected or is determined to never be selected due to insufficient mention of the word) (block 312, "Yes"), then the search document attribute addition function 140 registers high ranking or high tally meta information 146 as search document attributes 136 for the word (block 314). High ranking meta information is registered by ranking all of the meta information 146 of the document by number of tallies (i.e., highest number of tallies to lowest number of tallies), and then selecting some number of the meta information 146 that have the highest number of tallies. For example, the search document attribute addition function 140 may register the top five, ten, or twenty-five instances of meta information 146 as search document attributes 136 for the word, or the search document attribute addition function 140 may register the top five, ten, or twenty-five percent of meta information 146 as search document attributes 136. High tally meta information 146 may include all meta information 146 that has a tally score over a given threshold. The threshold for high tally meta information 146 may be determined by the search document attribute addition function 140 for each individual word, or may be selected for the synonym dictionary 130 as a whole.

When the word has all the search document attributes 136 registered, then the search document attribute addition function 140 determines whether all words in the synonym dictionary 130 have been selected (block 316). If all the words have not been selected (block 316, "No"), then the search document attribute addition function 140 selects another word from the synonym dictionary 130 (block 302, again) and repeats the process. When all the words in the synonym dictionary 130 have search document attributes 136 registered (block 316, "Yes"), then the search document attribute addition function 140 presents the synonym dictionary 130 with the search document attributes 136 to the search result narrowing program 120. The synonym dictionary 130 may be available to the search result narrowing program 120 in the form of a search document attribute table 502, as shown in FIG. 5.

Figure 5:
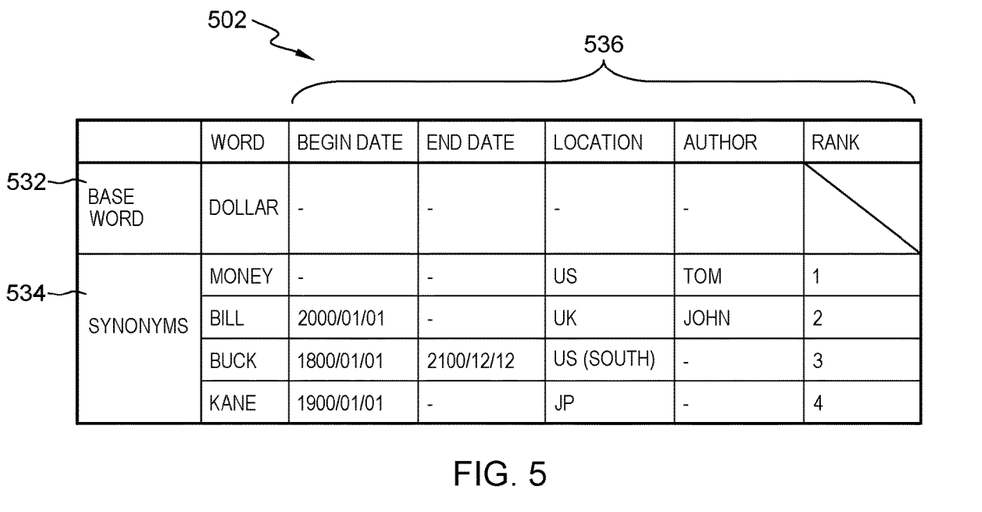
FIG. 5 is table depicting a search document attribute table, in accordance with one embodiment of the present invention.

FIG. 5 is table depicting a search document attribute table 502, in accordance with one embodiment of the present invention. The search document attribute table 502 shows a base word 532 (i.e., dollar) and synonyms 534 (i.e., money, bill, bucks, and kane) matched with accompanying search document attributes 536. As shown, each word (base word 532 or synonym 534) is not assigned all available search document attributes 536, since the search document attribute addition function 140 only registered meta information with a high rank or high tally. For example, Buck and kane do not have author search document attributes 536 because the tally for any associated author was not high ranking enough, and/or did not have enough tallies, for the search document attribute addition function 140 to register the author to the word "buck" or the word "kane." The search document attribute table 502 may also include a ranking (typically user-designated) for designating synonyms 534 that are more like the base word 532.

Figure 6:
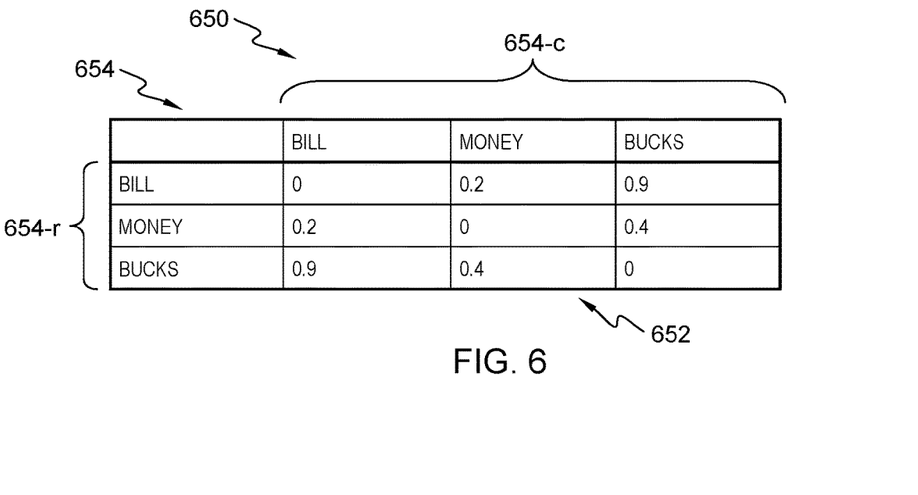
FIG. 6 is a table depicting an inter-word distance matrix, in accordance with one embodiment of the present invention.

Returning to FIG. 2, the search result narrowing program 120 may also create an inter-word distance matrix 150 (block 204). FIG. 6 is a table depicting an inter-word distance matrix 650, in accordance with one embodiment of the present invention. The inter-word distance matrix 650 includes scores 652 for each combination of row words 654-$r$ and column words 654-$c$. The score 652 may be determined using a variety of methods, but is designed to represent the difference in meaning between one word 654 and another word 654. For example, cells matching words with themselves have a score 652 of "0" because there is not any difference between the words 654. A score close to "1" on the other hand indicates that the words are not as close in meaning. One method of calculating the scores 652 may be to use each search document attribute and determine a Euclidean mean between each. For example, a distance between "bill" and "buck" may be measured using:

$$D_{(bill-buck)} = (L_{bill} - L_{buck})^2 + (BD_{bill} - BD_{buck})^2 + (ED_{bill} - ED_{buck})^2 + (A_{bill} - A_{buck})^2$$

where D is the distance, L is the location scores, BD is the begin date scores, ED is the end date scores, and A is the author score. In certain embodiments, each component is normalized before combination with the other scores. The begin date and end date score may be readily represented mathematically, but author and location scores may require more nuance.

For example, authors that have lived in proximate areas for the same period, being in similar occupations, or having similar hobbies, or the like are considered to come to resemble each other in the choice of words or vocabularies (dialect, buzzword, etc.) so that a distance is calculated by using an equation in which authors with attribute information more closely resembling each other are set to be in a closer distance. Furthermore, vector scores for date of birth and death, hometown, country/region and period of residence, school, and workplace, educational background and enrollment period, work history and period, affiliated community and period, occupation, type of work, workplace, qualification, hobby, skill, family structure, religion, each family/relative's attribute, etc., may be compared so that similar authors have a similar vector score. For attributes that can be classified according to the field of study or type of work, etc., a distance between fields is defined separately in distance calculation. Attributes that are not necessarily classifiable such as attributes of hobbies or affiliated communities are added as labels to authors so that a distance can be calculated according to the number of common labels. Time Period and region, etc., of activities pertaining to individual attributes are added as sub-attributes so that weighting based on these sub-attributes may be applied to distance calculation between attributes. Distances calculated for individual attributes are weighted as needed and then processed by being added, multiplied, or the like, to calculate a comprehensive distance between authors.

Returning once again to FIG. 2, the search result narrowing program 120 may also receive a search query 110 (block 206). The search query may be received from the client device 104, and may be designated for a specific database within the searching environment 100. In certain embodiments, the search query may be directed to a general internet search for documents or webpages containing the words in the search query. Upon receipt of the search query, the search result narrowing program 120 generates a document group 160 from the search query 110 (block 208). The search query 110 may be expanded using the synonym dictionary 130. That is, documents may be included in the document group 160 even if the documents only contain words that are synonyms of the search query 110, as listed in the synonym dictionary 130. Depending on the specificity of the search query 110, the document group 160 may include unhelpful results, and too many results, when all the synonyms are used to add documents to the document group 160. Therefore, the search result narrowing program 120 also extracts documents from the document group 160, which are designated extracted documents 162 (block 210). The extracted documents 162 are the documents from the document group 160 that are the most similar to the search query 110, as explained with regard to FIG. 7.

Figure 7:
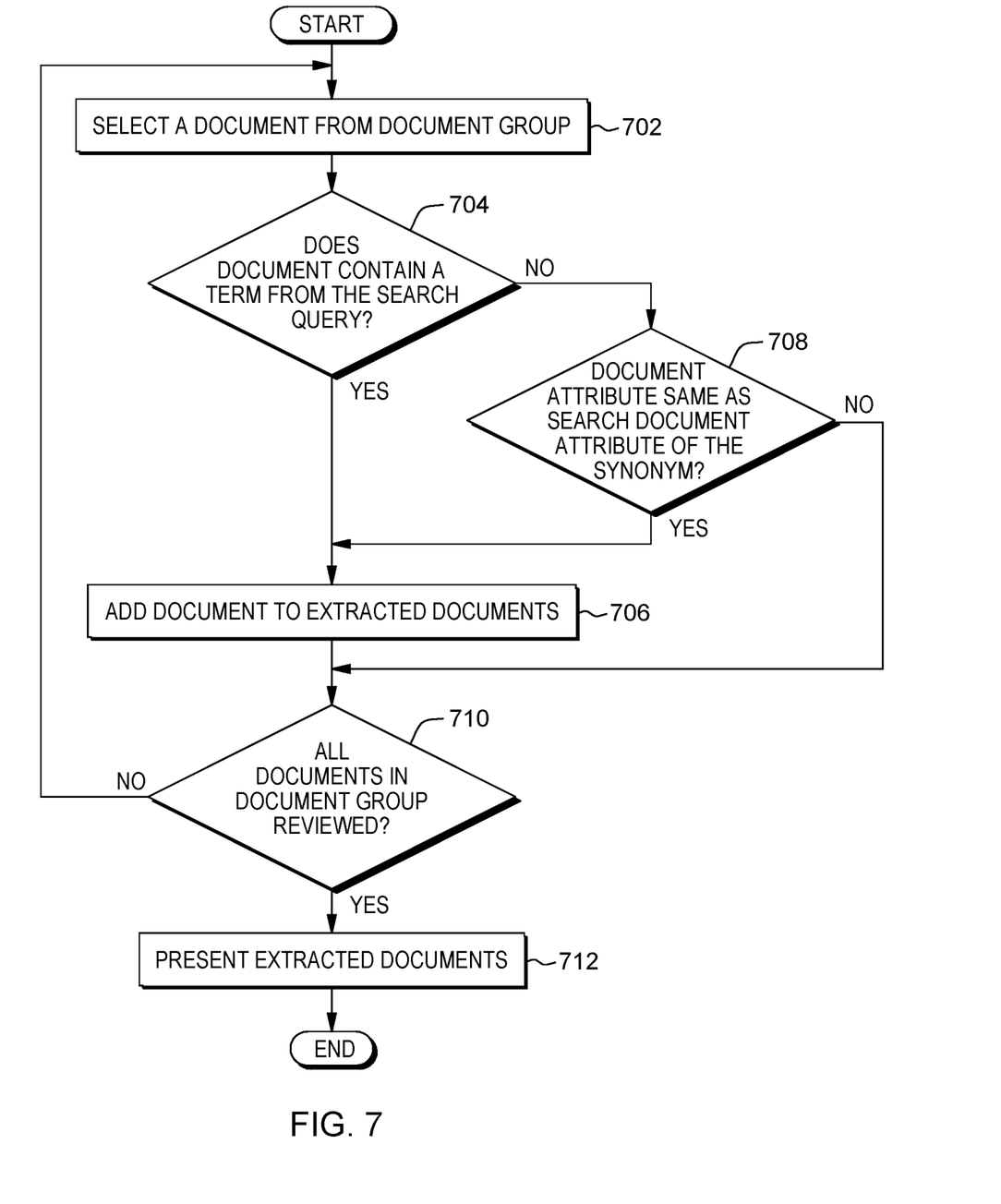
FIG. 7 is a flowchart depicting operational steps of a document extraction function, in accordance with an embodiment of the present invention.

FIG. 7 is a flowchart depicting operational steps of a document extraction function 122, in accordance with an embodiment of the present invention. The document extraction function 122 selects a document from the document group 160 (block 702). The document extraction function 122 also determines whether the document contains a term from the search query 110 (block 704). If the document does contain a term from the search query (block 704, "Yes"), then the document extraction function 122 adds the document as an extracted document 162 (block 706). If the document does not contain a term from the search query (block 704, "No"), then the document extraction function 122 determines the synonym 134 (or multiple synonyms 134) that is contained in the document, and determines whether the document has a document attribute that is the same as a search document attribute 136 of the synonym 134 (block 708). If document attributes did not accompany the document group 160, then the document extraction function 122 may also read meta information of the documents in the document group 160 to determine document attributes for each document. For documents that do have a document attribute the same as a search document attribute 136 of the synonym 134 (block 708, "Yes"), the document extraction function 122 adds the documents to the extracted documents 162 (block 706). For documents that do not have a document attribute the same as a search document attribute 136 of the synonym 134 (block 708, "No"), the document extraction function 122 proceeds to the determining whether all the documents in the document group 160 have been reviewed (block 710) without adding the document to the extracted documents 162.

If all the documents have not been reviewed (block 710, "No"), then the document extraction function 122 reviews another document from the document group 160 (block 702, again) and repeats the process. When all the documents in the document group 160 have been reviewed (block 710, "Yes"), then the document extraction function 122 presents the extracted documents 162 (block 712). For example, the extracted documents 162 may be presented to the user or the device that submitted the search query 110.

Alternatively or additionally, the document extraction function 122 may extract the extracted documents 162 using an index 170. The index 170 allows the document extraction function 122 to extract documents that have been indexed to the terms of the search query 110, without reviewing each document individually as described above. To extract the documents from the index 170, the document extraction function 122 must perform indexing, which may be performed at any point before the extracted documents 162 are extracted.

Figure 8:
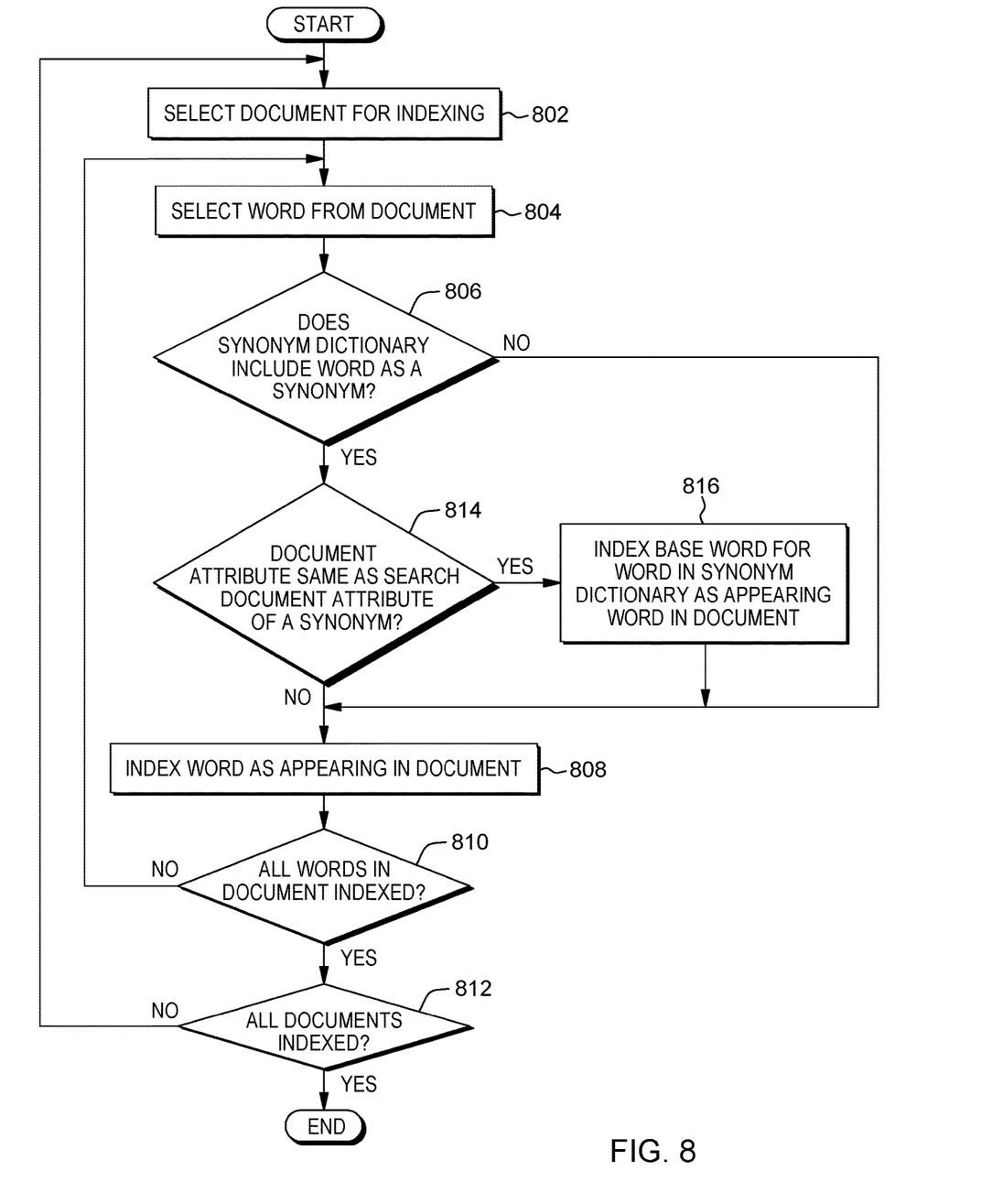
FIG. 8 is a flowchart depicting operational steps of a document extraction function creating an index, in accordance with an embodiment of the present invention.

FIG. 8 is a flowchart depicting operational steps of a document extraction function 122 creating the index 170, in accordance with an embodiment of the present invention. The document extraction function 122 selects a document for indexing 172 (block 802). The document for indexing 172 may be any document that could potentially be a result for the search query 110. Indeed, the process of indexing is intended to thoroughly include as many documents as possible so that the document extraction function 122 does not have to individually review documents after receiving search query 110. Within the document for indexing 172, the document extraction function 122 selects a word for indexing 174 (block 804). All of the words in the document for indexing 172 are meant to be included in the index 170, so the word for indexing 174 may be the first word in the document for indexing 172, or any other word. The document extraction function 122 then determines whether the synonym dictionary 130 contains the word for indexing 174 as a synonym 134 (block 806). If the synonym dictionary 130 does not includes the word for indexing 174 (block 806, "No"), then the document extraction function 122 indexes the word for indexing 174 as appearing in the document for indexing 172 (block 808). The document extraction function 122 then determines whether all the words in the document for indexing 172 have been indexed (block 810). If all the words have not been indexed (block 810, "No") then the document extraction function 122 selects another word as the word for indexing 174 (block 804, again).

When all the words in the document for indexing 172 have been indexed (block 810, "Yes"), then the document extraction function 122 determines whether all documents have been indexed (block 812). If all the documents have not been indexed (block 812, "No") then the document extraction function 122 selects another document as the document for indexing 172 (block 802, again). When all the documents (block 812, "Yes"), then the document extraction function 122 stops indexing.

If the synonym dictionary 130 includes the word for indexing 174 as a synonym 134 (block 806, "Yes"), the document extraction function 122 determines whether a document attribute of the document for indexing 172 is the same as a search document attribute 136 of the synonym 134 (block 814). If the document attribute of the document for indexing 172 is not the same as the search document attribute 136 of the synonym 134 (block 814 "No"), then the document extraction function 122 indexes the word for indexing 174 as appearing in the document for indexing 172 (block 808). If, however, the document attribute of the document for indexing 172 is the same as the search document attribute 136 of the synonym 134 (block 814 "Yes"), then the document extraction function 122 indexes the base word 132 of the word for indexing 174 as appearing in the document for indexing 172 (block 816) as well as indexing the word for indexing 174 (i.e., the synonym 134) as appearing in the document for indexing 172 (block 808).

In certain embodiments, the extracted documents 162 may be presented as they are extracted, but as shown in FIG. 2, the search result narrowing program 120 may adjust ranking of the extracted documents 162 using the inter-word distance matrix 150 (block 212). As explained above, the inter-word distance matrix 150 gives a score for each combination between terms in the search query 110 and synonym 134, and the search result narrowing program 120 may rank the extracted documents 162 according to the lowest score. The search result narrowing program 120 may then list the search result (block 214). The search result as ranked and extracted by the search result narrowing program 120 is more applicable and relevant due to the narrowing of documents that do not relate as well to the terms of the search query 110.

Figure 9:
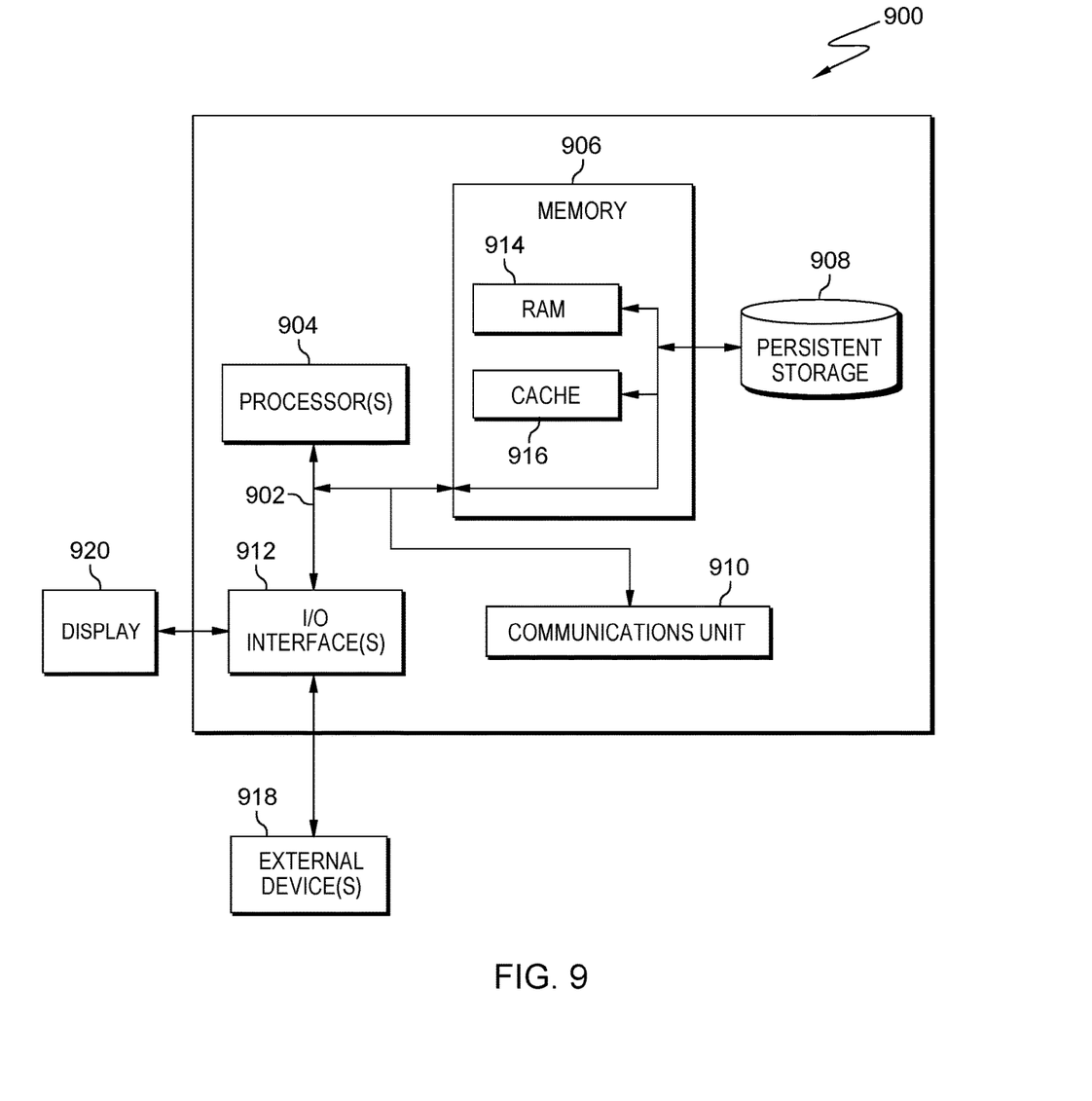
FIG. 9 depicts a block diagram of components of a computing device, in accordance with an illustrative embodiment of the present invention.

FIG. 9 depicts a block diagram of components of a computing device 900 in accordance with an illustrative embodiment of the present invention. The computing device 900 may represent any of the devices (e.g., the server 102, the client device 104, or the network storage device 106) described above, or a combination of the devices, in the embodiments where the devices are embodied as components of a single computing device. It should be appreciated that FIG. 9 provides only an illustration of one implementation and does not imply any limitations with regard to the environments in which different embodiments may be implemented. Many modifications to the depicted environment may be made.

The computing device 900 includes communications fabric 902, which provides communications between RAM 914, cache 916, memory 906, persistent storage 908, communications unit 910, and input/output (I/O) interface(s) 912. Communications fabric 902 can be implemented with any architecture designed for passing data and/or control information between processors (such as microprocessors, communications and network processors, etc.), system memory, peripheral devices, and any other hardware components within a system. For example, communications fabric 902 can be implemented with one or more buses or a crossbar switch.

Memory 906 and persistent storage 908 are computer readable storage media. In this embodiment, memory 906 includes random access memory (RAM). In general, memory 906 can include any suitable volatile or non-volatile computer readable storage media. Cache 916 is a fast memory that enhances the performance of computer processor(s) 904 by holding recently accessed data, and data near accessed data, from memory 906.

The software components (e.g., search result narrowing program 120, document extraction function 122, search document attribute addition function 140) may be stored in persistent storage 908 and in memory 906 for execution and/or access by one or more of the respective computer processors 904 via cache 916. In an embodiment, persistent storage 908 includes a magnetic hard disk drive. Alternatively, or in addition to a magnetic hard disk drive, persistent storage 908 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 908 may also be removable. For example, a removable hard drive may be used for persistent storage 908. Other examples include optical and magnetic disks, thumb drives, and smart cards that are inserted into a drive for transfer onto another computer readable storage medium that is also part of persistent storage 908.

Communications unit 910, in these examples, provides for communications with other data processing systems or devices. In these examples, communications unit 910 includes one or more network interface cards. Communications unit 910 may provide communications through the use of either or both physical and wireless communications links. The proxy, application, access manager, collection page, authentication tool, or multi-factor authentication page may be downloaded to persistent storage 908 through communications unit 910.

I/O interface(s) 912 allows for input and output of data with other devices that may be connected to the computing device 900. For example, I/O interface 912 may provide a connection to external devices 918 such as a keyboard, keypad, a touch screen, and/or some other suitable input device. External devices 918 can also include portable computer readable storage media such as, for example, thumb drives, portable optical or magnetic disks, and memory cards. Software and data used to practice embodiments of the present invention (e.g., proxy, application, access manager, collection page, authentication tool, or multi-factor authentication page) can be stored on such portable computer readable storage media and can be loaded onto persistent storage 908 via I/O interface(s) 912. I/O interface(s) 912 also connect to a display 920.

Display 920 provides a mechanism to display data to a user and may be, for example, a computer monitor.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented method for improving generation and relevancy of search results, comprising:
    creating an inter-word distance matrix by calculating vector scores between base words and synonyms for the base words, wherein calculating the vector scores comprises using an equation that sets a closer distance for the synonyms that are used in previous documents with document attributes that are closely related to document attributes of previous documents using the base words;
    receiving, by one or more processors, a search query comprising a search term;
    generating, by one or more processors, a document group of documents comprising document attributes based on the search query and at least one synonym related to the search term in a synonym dictionary, wherein the synonym dictionary comprises the base words and the synonyms for the base words, and wherein each synonym comprises search document attributes specifying conditions under which previous documents were drafted in which the synonym is used with a meaning that is close to the base word;
    selecting, by one or more processors, a first document from the document group;
    determining, by one or more processors, that the first document has at least one document attribute matching one of the search document attributes of the synonym;
    selecting, by one or more processors, a second document from the document group;
    determining, by one or more processors, that the second document has no document attributes matching any search document attributes of the synonym;
    extracting the first document to a group of extracted documents and excluding the second document from the group of extracted documents; and
    listing the group of extracted documents as a search result with a ranking based on the vector scores in the inter-word distance matrix.

2. The method of claim 1, comprising indexing the synonym and the search term as appearing words in the extracted document.

3. The method of claim 2, wherein extracting the group of extracted documents comprises selecting documents that are indexed to the search term.

4. The method of claim 1, wherein the search document attribute comprises a selection from the group consisting of: a year of creation, an author's hometown, an author's age at the time of writing, an author's living environment, a document subject, and a story setting.

5. The method of claim 1, comprising adding the search document attributes to the base words and the synonyms in the synonym dictionary.

6. The method of claim 5, wherein adding the search document attribute comprises tallying meta information from a corpus of documents.

7. The method of claim 1, wherein extracting the group of extracted documents comprises reviewing each document in the document group.

8. The method of claim 1, wherein the equation comprises a selection from the group consisting of a distance score, a location score, a begin date score, an end date score, and an author score.

9. A computer program product comprising:
    one or more computer readable storage media, and program instructions collectively stored on the one or more computer readable storage media, the program instructions comprising:

program instructions to create an inter-word distance matrix by calculating vector scores between base words and synonyms for the base words, wherein calculating the vector scores comprises using an equation that sets a closer distance for the synonyms that are used in previous documents with document attributes that are closely related to document attributes of previous documents using the base words;

program instructions to receive a search query comprising a search term;

program instructions to generate a document group of documents comprising document attributes based on the search query and at least one synonym related to the search term in a synonym dictionary, wherein the synonym dictionary comprises the base words and the synonyms for the base words, and wherein each synonym comprises search document attributes specifying conditions under which previous documents were drafted in which the synonym is used with a meaning that is close to the base word;

program instructions to select a first document from the document group;

program instructions to determine that the first document has at least one document attribute matching one of the search document attributes of the synonym;

program instructions to select a second document from the document group;

program instructions to determine that the second document has no document attributes matching any search document attributes of the synonym;

program instructions to extract the first document to a group of extracted documents and excluding the second document from the group of extracted documents; and program instructions to list the group of extracted documents as a search result with a ranking based on the vector scores in the inter-word distance matrix.

10. The computer program product of claim 9, comprising program instructions to index the synonym and the search term as appearing words in the extracted document.

11. The computer program product of claim 10, wherein extracting the group of extracted documents comprises selecting documents that are indexed to the search term.

12. The computer program product of claim 9, wherein the search document attribute comprises a selection from the group consisting of: a year of creation, an author's hometown, an author's age at the time of writing, an author's living environment, a document subject, and a story setting.

13. The computer program product of claim 9, comprising program instructions to add the search document attributes to the base words and the synonyms in the synonym dictionary.

14. The computer program product of claim 9, wherein extracting the group of extracted documents comprises reviewing each document in the document group.

15. A computer system, comprising:
one or more computer processors, one or more computer readable storage media, and program instructions collectively stored on the one or more computer readable storage media for execution by at least one of the one or more computer processors, the program instructions comprising:

program instructions to create an inter-word distance matrix by calculating vector scores between base words and synonyms for the base words, wherein calculating the vector scores comprises using an equation that sets a closer distance for the synonyms that are used in previous documents with document attributes that are closely related to document attributes of previous documents using the base words;

program instructions to receive a search query comprising a search term;

program instructions to generate a document group of documents comprising document attributes based on the search query and at least one synonym related to the search term in a synonym dictionary, wherein the synonym dictionary comprises the base words and the synonyms for the base words, and wherein each synonym comprises search document attributes specifying conditions under which previous documents were drafted in which the synonym is used with a meaning that is close to the base word;

program instructions to select a first document from the document group;

program instructions to determine that the first document has at least one document attribute matching one of the search document attributes of the synonym;

program instructions to select a second document from the document group;

program instructions to determine that the second document has no document attributes matching any search document attributes of the synonym;

program instructions to extract the first document to a group of extracted documents and excluding the second document from the group of extracted documents; and program instructions to list the group of extracted documents as a search result with a ranking based on the vector scores in the inter-word distance matrix.

16. The computer system of claim 15, comprising program instructions to index the synonym and the search term as appearing words in the extracted document.

17. The computer system of claim 16, wherein extracting the group of extracted documents comprises selecting documents that are indexed to the search term.

18. The computer system of claim 15, wherein the search document attribute comprises a selection from the group consisting of: a year of creation, an author's hometown, an author's age at the time of writing, an author's living environment, a document subject, and a story setting.

19. The computer system of claim 15, comprising program instructions to add the search document attributes to the base words and the synonyms in the synonym dictionary.

20. The computer system of claim 15, wherein extracting the group of extracted documents comprises reviewing each document in the document group.

* * * * *